United States Patent [19]

Lara et al.

[11] Patent Number: 5,461,298
[45] Date of Patent: Oct. 24, 1995

[54] AUTOMATIC ELECTRIC VEHICLE CHARGING SYSTEM

[75] Inventors: Jesus D. Lara, Lahambra; Mario P. Palombo, Manhattan Beach; Robert W. Klatt, Rancho Palos Verde; Daniel P. Brown, Manhattan Beach, all of Calif.

[73] Assignee: Hughes Aircraft Company, Los Angeles, Calif.

[21] Appl. No.: 6,065

[22] Filed: Jan. 15, 1993

[51] Int. Cl.$^6$ .................................................. H01M 10/46
[52] U.S. Cl. ......................................... 320/2; 901/47
[58] Field of Search ........................ 320/2, 48, 61; 74/479 B, 479 BP; 395/80, 82, 93, 86; 901/2, 16, 17, 18, 23, 47

[56] References Cited

U.S. PATENT DOCUMENTS

| | | | |
|---|---|---|---|
| 4,158,802 | 6/1979 | Rose, II | 320/2 |
| 4,347,472 | 8/1982 | Lemelson | 320/2 |
| 4,766,322 | 8/1988 | Hashimoto | 901/47 X |
| 5,049,802 | 9/1991 | Mintus et al. | 320/2 |
| 5,111,126 | 5/1992 | Powell et al. | 901/47 X |
| 5,272,431 | 12/1993 | Nee | 320/2 |
| 5,306,999 | 4/1994 | Hoffman | 320/2 |
| 5,321,353 | 6/1994 | Furniss | 901/47 X |
| 5,349,378 | 9/1994 | Maali | 901/47 X |

*Primary Examiner*—Peter S. Wong
*Assistant Examiner*—Edward Tso
*Attorney, Agent, or Firm*—Georgann S. Grunebach; Wanda K. Denson-Low

[57] ABSTRACT

A system and method for automatically docking a vehicle with respect to a charge station. First, the system and method automatically aligns a charge probe arm 40 with respect to a vehicle charge port 50. Next, the system and method automatically establish a power connection between the probe 40 and port 50. Next, charging power is delivered through the connection to charge the electric power storage devices of the vehicle. Finally, the charging connection is automatically disconnected by disconnecting the probe 40 from the port 50 once charging is completed.

11 Claims, 13 Drawing Sheets

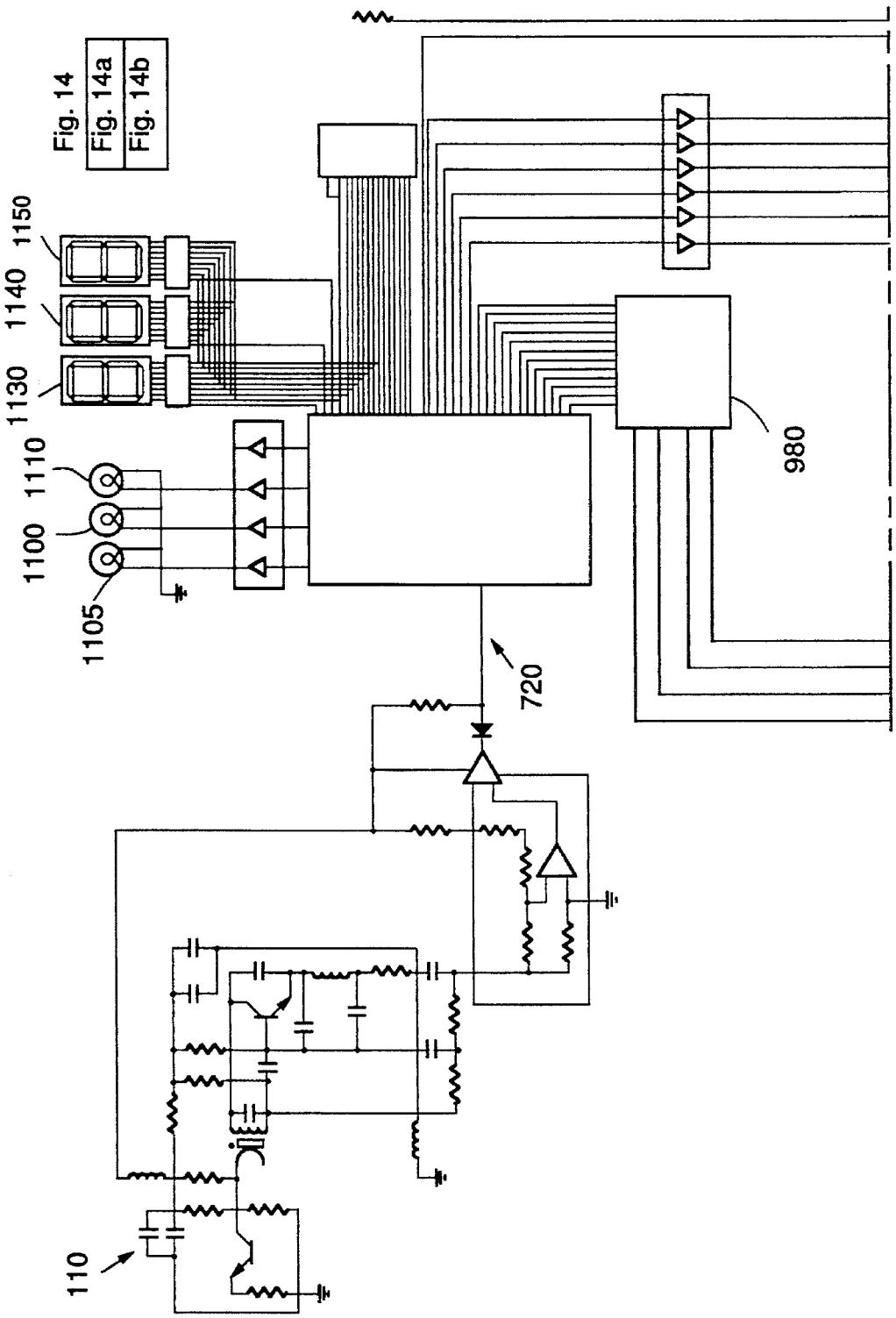

AUTOMATIC ELECTRIC VEHICLE CHARGING SYSTEM

BACKGROUND OF THE INVENTION

1. Field of Invention

This invention relates generally to a charging apparatus for an electric vehicle, and more particularly to an automated charging system for docking and charging an electric vehicle.

2. Description of Related Art

With concerns over pollution rising, there has been greater interest in the use of electric powered vehicles for passenger transportation. While limitations such as charging capacity and vehicle speed had previously made large scale implementation of electric vehicles unworkable, advances in technologies such as storage cell design, braking regeneration, and motor efficiency have made electric vehicles a viable alternative to vehicles powered by internal combustion engines. However, one major limitation to the full scale implementation of electric vehicle fleets remains: providing a safe, effective means for recharging the storage devices of electric vehicles.

For example, the power storage capacity of an electric vehicle has been improved to the point where electric vehicles now have ranges similar to that of combustion engine powered vehicles. However, while the fuel cell of a combustion engine (i.e. gas tank) can be refueled at locations like service stations in ten minutes or less, "refueling" an electric storage cell may take several hours. Therefore, it is more likely that consumers will perform the bulk of their recharging needs overnight while the vehicle is parked in their garage or during the work day while the vehicle is parked in the parking lot at work.

To date, most electric vehicle charging systems involve the connection of a power cable between the vehicle and a charging tower or station. This presents several disadvantages. First, the power cord must be provided either at the charging station or be carried with the vehicle. If the cord is provided at the power station, there is risk that the cord may become damaged due to improper use by the many different people who would utilize the charging station. The cord may become frayed, or the plug connectors damaged due to misuse or abuse. Likewise, if the cord is to be carried with the vehicle, repeated use and abuse of the cable can cause damage. Also, the driver may forget the cable, or it could be stolen from the vehicle. Whether the power cable is associated with the vehicle or the charging station, severe damage to the cable and charging connectors on the vehicle and charging station could result if the vehicle is driven away with the cord still engaged. Likewise, the power cable connecters may be damaged by accidentally driving a vehicle wheel over the power cable connector.

Also, by requiring the vehicle driver to establish the power cable connection between the vehicle and the charging station, risk of personal injury is increased. A careless or inexperienced user may accidentally short across the power terminals. Inclement weather such as rain and snow increase the risk that the charging circuit may be accidentally shorted while connecting the system. Also, there is the risk that the user may connect the polarity of the charging system incorrectly, or that the user will fail to observe proper safety procedures such as waiting until the connection is fully established before activating the power generation system.

Other contingencies pose challenges as well. For example, different types of vehicles will likely require different charging voltages and will have different charge storage capacities. Therefore, the user may be confronted with having to select the proper type of charging station and charging cord to meet his vehicle's charging requirements. Or, the user may be required to manually set the charging station to deliver the proper total charge and charging rate to his vehicle. Obviously, the chances that an inexperienced or careless user would deliver improper charging rates to his vehicle's charging system increases the likelihood that the system will be damaged and therefore require repair.

Finally, because most known methods of connecting a charging system to an electric storage cell necessitates some form of connector having a relatively higher degree of resistance than found in the other portions of the charging circuit, the charging connector becomes hot, risking injury to the user and increasing the risk that surrounding combustible materials may ignite.

It would therefore be advantageous to provide an electric vehicle charging system which does not require the user to manually establish a connection between the vehicle and the charging station. Such a system should be capable of automatically ensuring that the correct charging rate and total charge is delivered to the vehicle to prevent overcharging of the vehicle's storage system. The charging system should also be capable of ensuring a good connection is made between the charging station and the electric vehicle to ensure the vehicle is indeed being charged. Furthermore, the system should prevent the delivery of charging power from the charging station until this connection is established, to reduce the risk of injury due to shock and risk of damage to the charging circuitry. Finally, it would be beneficial if such a system were universal, such that any variety of vehicles could be charged from a single charging station, obviating the need for special adapters.

SUMMARY OF THE INVENTION

It is therefore an object of the present invention to provide a method and apparatus for automatically charging electric vehicles. The method of the present invention provides for the docking of the electric vehicle within a predetermined proximity of the charging station so that a charging connection can be established. The charging connection is established automatically, requiring no action on the part of the vehicle user. Once the charging connection is established, the charging station delivers the proper charging rate and total charge to the vehicle. Upon completing the charging cycle, the charging station automatically disconnects from the vehicle, to allow the vehicle to depart from the charging station. The apparatus of the present invention includes a charging station having a probe means and a power generation means. Generated power is delivered to the electric vehicle through the probe means. Vehicle alignment means is provided to ensure proper docking alignment between the vehicle and the charging station, and probe alignment means are provided for ensuring the probe establishes a secure electrical connection with the electric vehicle.

One advantage of the present invention is that the charging station and electric vehicle cooperate to ensure proper docking of the vehicle with regard to the charging station. A second advantage of the present invention is that the charging probe on the charging station automatically connects to the electric vehicle without requiring the vehicle user to become involved. A further advantage of the present invention is that the charging station and electric vehicle cooperate to ensure that proper charging current and proper total charge is delivered to the electric vehicle to prevent damage to the charging system.

BRIEF DESCRIPTION OF THE DRAWINGS

These and other objects, features and advantages of the present invention can be better appreciated by referring to the following description in conjunction with the drawings in which:

FIGS. 14a and 14b respect a circuit diagram detailing the circuitry necessary to implement the system at the charge station.

DETAILED DESCRIPTION OF THE PRESENTLY PREFERRED EMBODIMENT

Figure 1A:
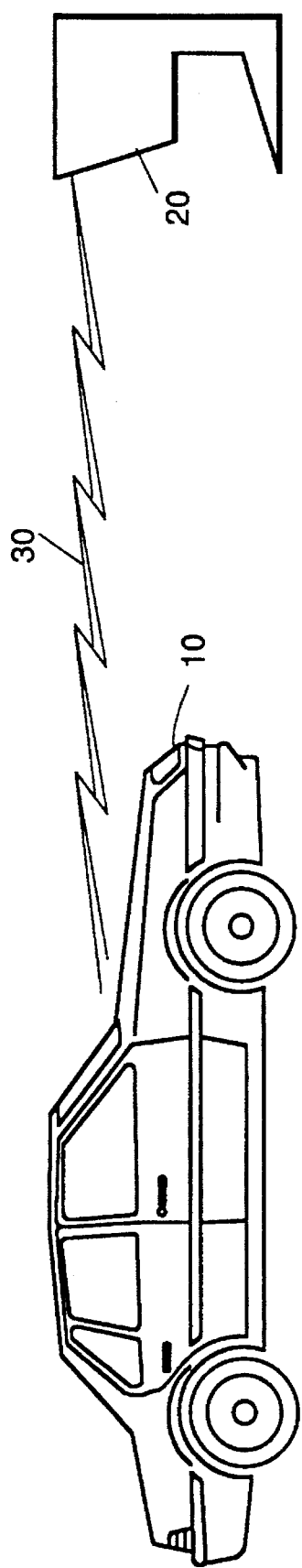
FIGS. 1A–1B are illustrations of the relationship between the electric vehicle and the charging station as the car docks and as it departs.
Figure 1B:
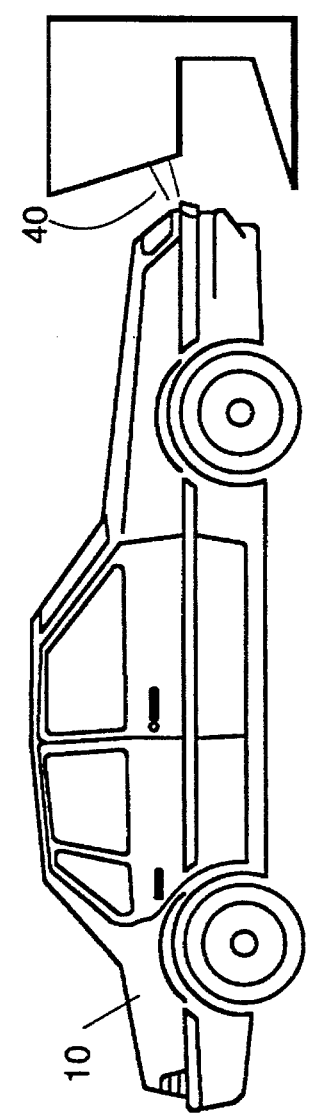

A general understanding of the operation of this system can be better understood by referencing FIGS. 1A through 1B. Here, the approach, docking, charging and departure of the vehicle with respect to the charging station is detailed. When the car 10 approaches the charging station 20, an electromagnetic signal 30 transmitted from the car to the charging station alerts the charging station 20 that the car 10 is approaching. As will be discussed in greater detail later in the disclosure, this electromagnetic signal 30 contains vehicle-specific information necessary to ensure the charging station properly interfaces with the vehicle. For example, this signal tells the charging station to set the charging current to the proper level and contains vehicle positioning information so the charging station can extend the charging probe 40 to couple with the vehicle's charging port 50. Thus, once the vehicle 10 is within a predetermined proximity of the charging station 20, the charging probe 40 extends to the proper position and couples with the car's charge port 50. In addition having crude alignment information via the signal link 30, means for accomplishing precise alignment are provided at the probe 40 and port 50 to ensure they couple securely. Once the coupling is established, the charging station 20 delivers charging power to the car 10 via the charging probe 40. Since the vehicle 10 and charging station 20 shared vehicle-specific information via the signal link 30, the charging station delivers the precise level of charging rate and total charging level required, thereby reducing the risk that the vehicle's charging system will be damaged by an overcharge. Of course, the vehicle-specific information signal link 30 could be omitted entirely, resulting in a "dumb" charging station which extends the charging probe 40 to a predetermined default position before attempting to couple with the charging port 50 and which delivers a predetermined default charge rate and total charge rather than a vehicle-specific charge. This would reduce the cost of the system somewhat by reducing the complexity of the circuitry, but may increase the likelihood that performance as measured by speed and efficiency would decline. These types of design decisions are well within the range of options available to one of ordinary skill in the art.

After the vehicle has been fully charged, or in the event that the vehicle is attempted to be driven away, the charging probe 40 retracts to allow the car 10 to depart.

The exchanging of vehicle-specific information via signal link, the positioning of the charging probe 40 with respect to the car 10 and the charging port 50, the delivery of power via the charging probe 40 and the disengagement of the charging probe 40 from the charging port 50 are all accomplished automatically, obviating the need for the driver to manually perform these operations. The manner in which this is accomplished will become more apparent later in the disclosure.

Figure 2:
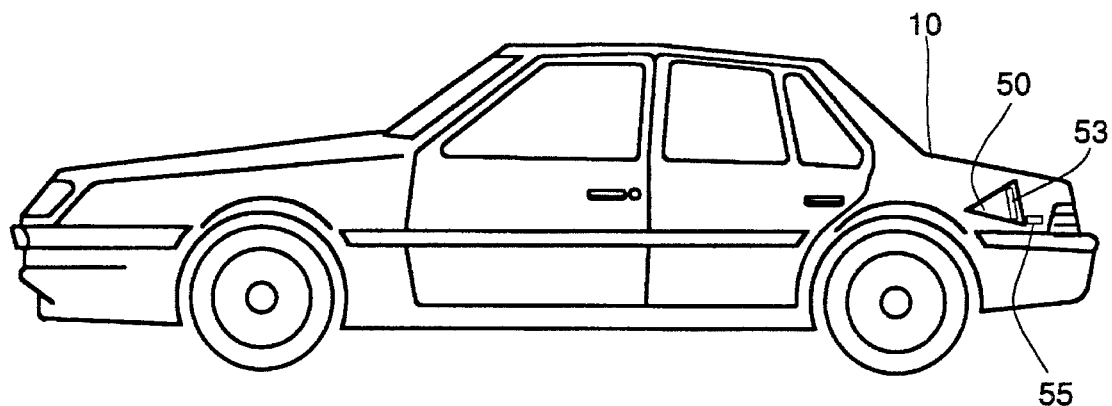
FIG. 2 is a perspective view showing the charging port on the electric vehicle.

As can be best seen in FIG. 2, the charging port 50 is preferably concealed, popping up only when necessary to charge the vehicle. In this embodiment, the charging port 50 is located on the front of the car 10. As part of the docking sequence which will be described in greater detail later, the charging port 50 is deployed when the car 10 approaches the charging station 20 so that the charging probe 40 may couple with it. It can be appreciated that it is desirable to selectively deploy the charging port 50 only when the vehicle is about to be charged, since leaving the charging port 50 exposed to the elements during normal vehicle operations may result in dirt and corrosion forming on the charging pads 53, reducing their ability to transmit electrical power effectively. In this embodiment, scrapers 55 brush along the surface of the pads 53 as the charging port is deployed and retracted. These scrapers help remove debris and corrosion to ensure a good contact is provided every time the charging port 50 and charging probe 40 couple. Of course, the manner in which these scrapers 55 scrape the port 50 as it is deployed and retracted can be adapted by one of ordinary skill to suit the particular needs of a certain application. It should be noted that the charging pads 53 are copper, while the rest of the port 50 is comprised of Ryton (polyphenylene sulfide), which is non-conductive, relatively easy to machine and rigid.

Figure 3:
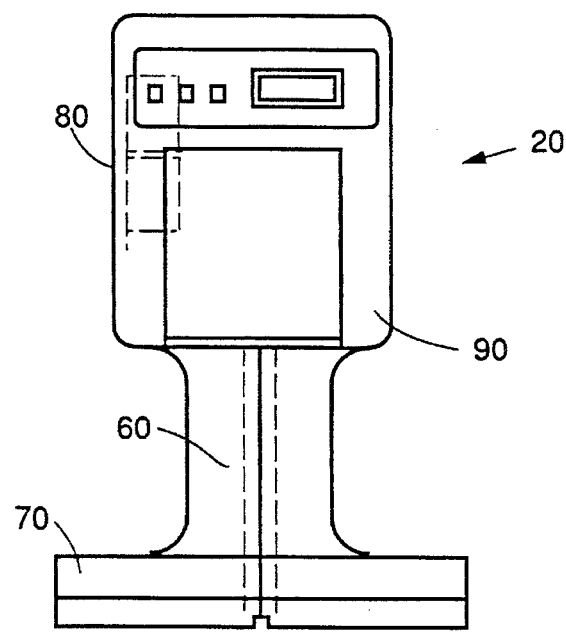
FIG. 3 is a perspective view showing the charging station.

As illustrated in FIG. 3, the charging station 20 has an enclosed fixture which houses the electronic circuitry and mechanism necessary for deploying, aligning, and coupling the charging probe 40 with the car 10. More particularly, a charging station 20 designed to charge small vehicles, such as passenger cars, is approximately thirty inches tall and eighteen inches wide having a pedestal 60 and base 70 connected to a main housing 80. The main housing 80 is attached to the pedestal 60 so that its face 90 faces toward the docked vehicle. Serving both aesthetic and functional needs, the face 90 is angled slightly downward to improve visibility for the driver and to keep the face free from debris.

The main housing 80, which encloses the charge probe mechanism and circuitry, is comprised of thermoset plastic, which is durable, easy to fabricate from molds, non-conducting and resistant to electrical shock. Because the main housing 80 encloses the charging circuitry, the size of the charging station 20 can increase so that heavy-duty charging electronics, such as may be required by large vehicles and trucks, can be accommodated. The base 70 is designed to be affixed to the garage floor or parking lot deck to prevent tipping of the charging station 20. As needed, interconnections can be made between the charging station 20 and electrical power through connection sites located in the base 70, pedestal 60 and/or main housing 80. Of course, one of ordinary skill could determine the electrical interconnection site best suited for the particular application.

Figure 4:
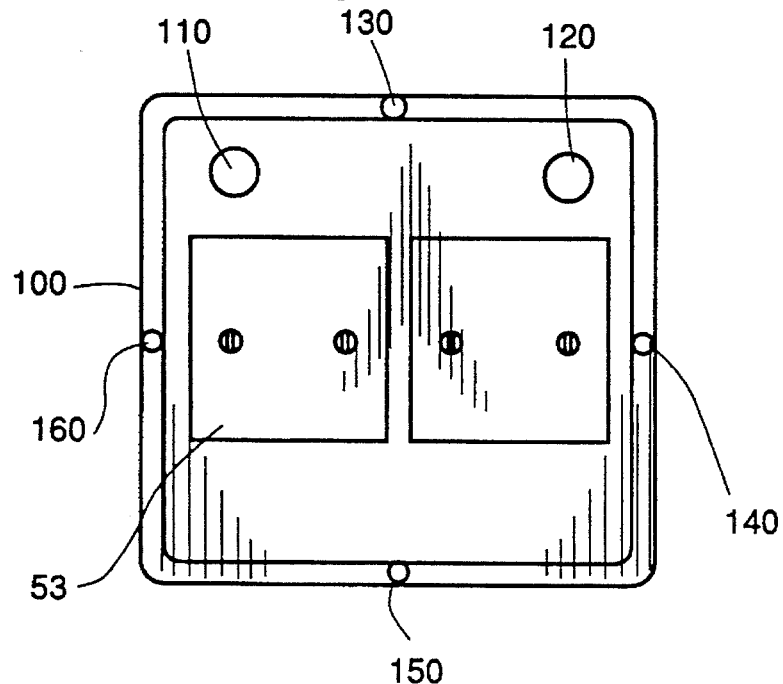
FIG. 4 is a detail view of the charging port on the vehicle.

As was mentioned earlier in the disclosure, the process of docking the vehicle within range of the charging station is automated. This is accomplished by providing for positioning feedback between the vehicle's charging port 50, the charging station 20 and the charging probe 40. These features are detailed in FIG. 4. More particularly, the port's generally square face plate 100 has two diodes 110, 120 to aid in docking of the vehicle. The diodes are aligned such that their light beams intersect at a predetermined position forward of the vehicle 10. As the car 10 approaches the charging station 20 and the charging port 50 has been deployed, the diodes 110, 120 shine an interference pattern on the face 90 of the charging station 20. Initially, the driver will see two separate light spots on the face 90 of the charging station 20. As the vehicle approaches the charging station, the two light spots will converge, intersecting when the vehicle is at that distance which has been predetermined to be the proper distance for the vehicle to dock with the charging station. Should the driver drive the car too close to the charging station, the light spots will again diverge, providing feedback to the driver that he needs to back up the car. It can be appreciated that providing for the docking of the vehicle within the proper proximity of the charging station using the docking diodes 110, 120 is preferable to position sensing systems requiring sensor pads or bumpers to be placed in front of the charging station. This not only reduces the cost of installing the system, but also reduces maintenance costs and makes the system flexible enough to be used by a variety of vehicles rather than being set up specifically to work with one particular vehicle. Because the docking diodes 110, 120 are associated with the vehicle rather than the charging station, the docking proximity system does not need to be reconfigured for different vehicles to compensate for differing docking proximities.

Also associated with the charge port's face plate 100 are four alignment emitters 130–160. These alignment emitters aid in the alignment and connection of the charge probe 40 with the charge port 50. As was earlier discussed, the car 10 and the charging station 20 share positioning information via an electromagnetic signal link 30 as the car approaches. Part of this transmission can include information for the alignment of the charging probe with respect to the vehicle 10. This information can be used to achieve a crude alignment between the probe 40 and port 50. In the case of a "dumb" charging station, the charging probe, rather than being initially extended to a crude alignment position specific to the particular vehicle, would be extended to a default alignment position. Regardless, the precise alignment process being described herein remains the same.

Figure 5:
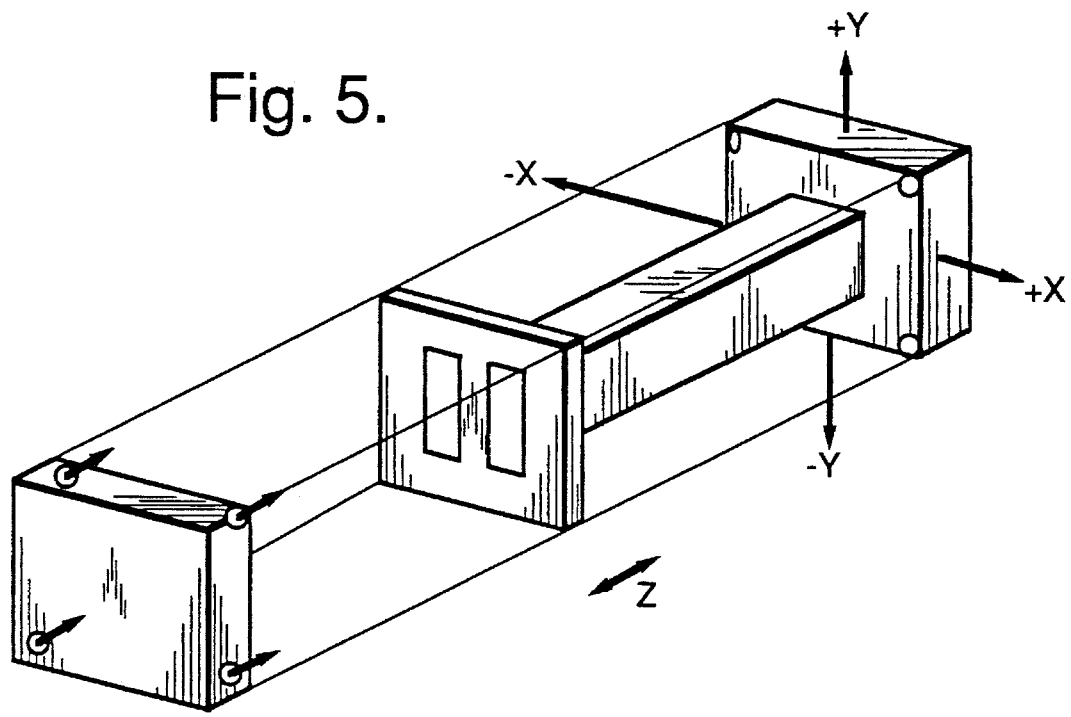
FIG. 5 is a detail view of the charging pad on the head of the charging station's charging probe showing the alignment motions possible.
Figure 6A:
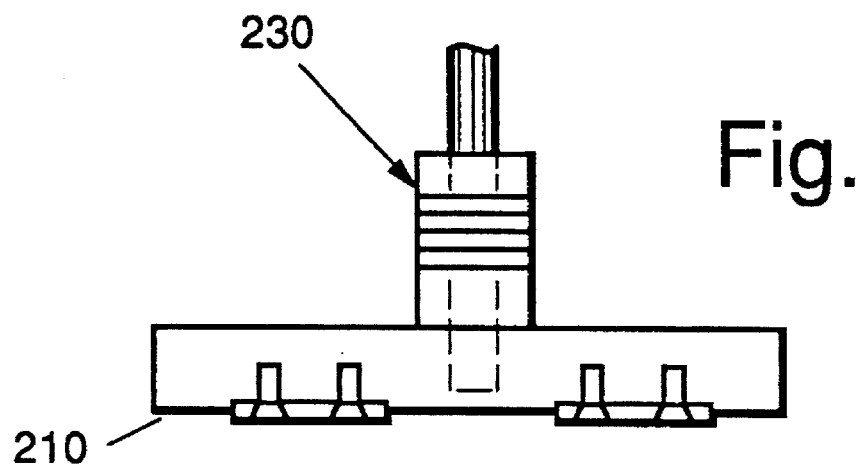
FIGS. 6a and 6b represent a detail view of the charging probe and charging pad flexible coupling.
Figure 6B:
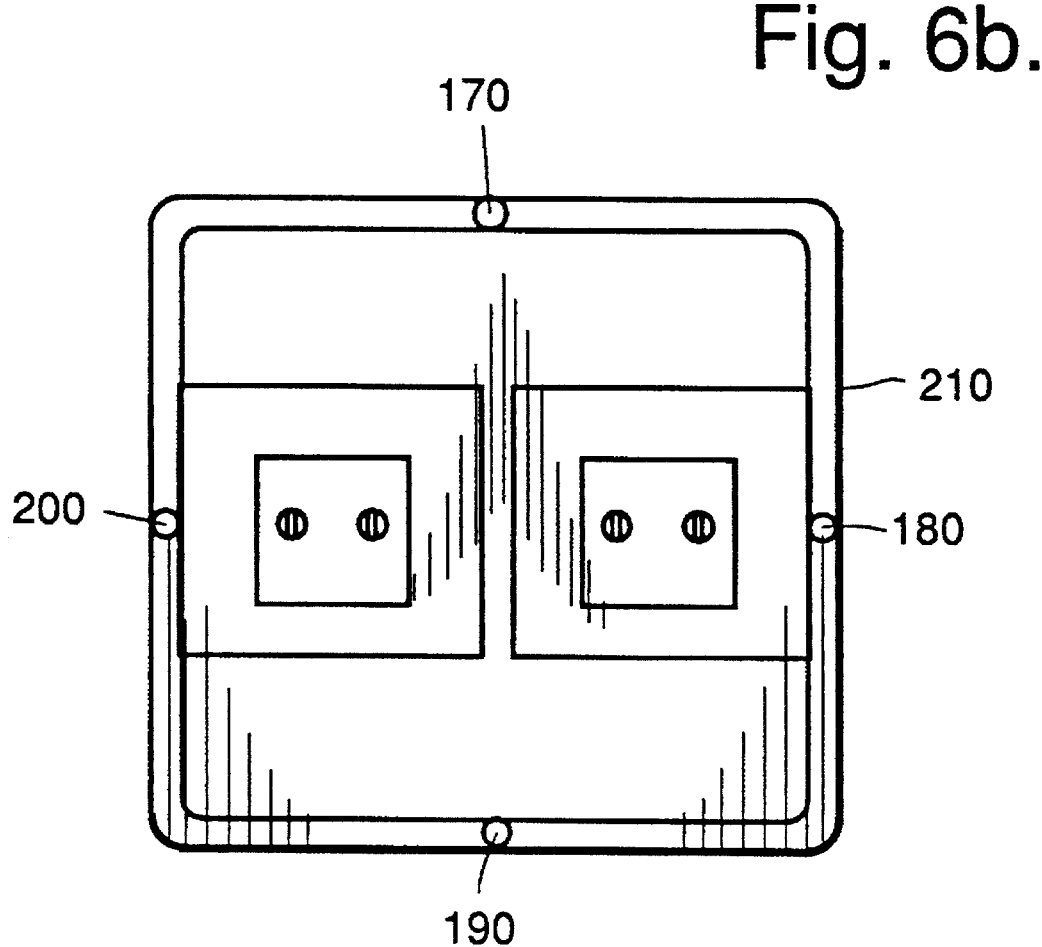

In order to ensure a fully automated docking process, it is necessary for the charging probe 40 to achieve precise alignment with respect to the charging port 50 in a reliable and efficient manner. Because it would be difficult to achieve such precise alignment using the visual alignment scheme previously disclosed, additional fine adjustment means are necessary. To achieve this end, the alignment emitters 130–160 send out pulsed light signals which are received by detectors 170–200 located on the charge probe 40. More particularly, as can be seen better in FIG. 5 and FIGS. 6a and 6b, the face plate 210 on the charge probe 40 is a square of similar proportions to the theoretical square defined by the alignment emitters 130–160, shown in FIG. 4 by the phantom lines. The alignment detectors 170–200 are arranged on the base of the probe arm 220 in a pattern essentially identical to the pattern of the alignment emitters 130–160 on the charge port 50. Thus, when proper alignment between the charge port 50 and the charge probe 40 is achieved, the probe face plate 210 allows all four emitter signals to pass around its perimeter and be detected by the alignment detectors 170–200. If the probe 40 is out of alignment with respect to the charge port 50, one or more of the emitters' signals will be blocked or shadowed by the probe face plate 210. By systematically articulating the probe 40 and monitoring whether the detectors 170–200 are receiving the light signals produced by the emitters 130–160, precise alignment of the probe 40 with respect to the charge port 50 can be accomplished automatically. It should be noted that the alignment emitters 130–160 emit a pulsed light signal, which overcome the effects ambient light might otherwise have on the alignment process. Because the detectors 170–200 are tuned to detect only a specific wave length of light pulsed at a certain rate as emitted by the emitters 130–160, ambient light such as sunlight or the vehicle headlights will not result in false alignment signals.

As just described, the positioning of the charge probe 40 with regard to the charge port 50 can be accomplished without any intervention on the part of the driver. However, while the crude and fine alignment procedures set forth are calculated to ensure the connection is secure, slight variations may still be present. Therefore, in order to ensure a secure coupling between the probe 40 and the charge port 50 once the rough and fine alignment procedures are accomplished, a flexible coupling 230 is provided at the point where the charge probe face 210 interfaces with the remainder of the charge probe 40. This feature is illustrated in FIG. 6. This flexible coupling allows for tilting of the face 21 0 with respect to the axis of the charge probe 40 to accommodate any slight differences that may exist between the plane of the probe face 210 and the plane of the port face 100.

Figure 7:
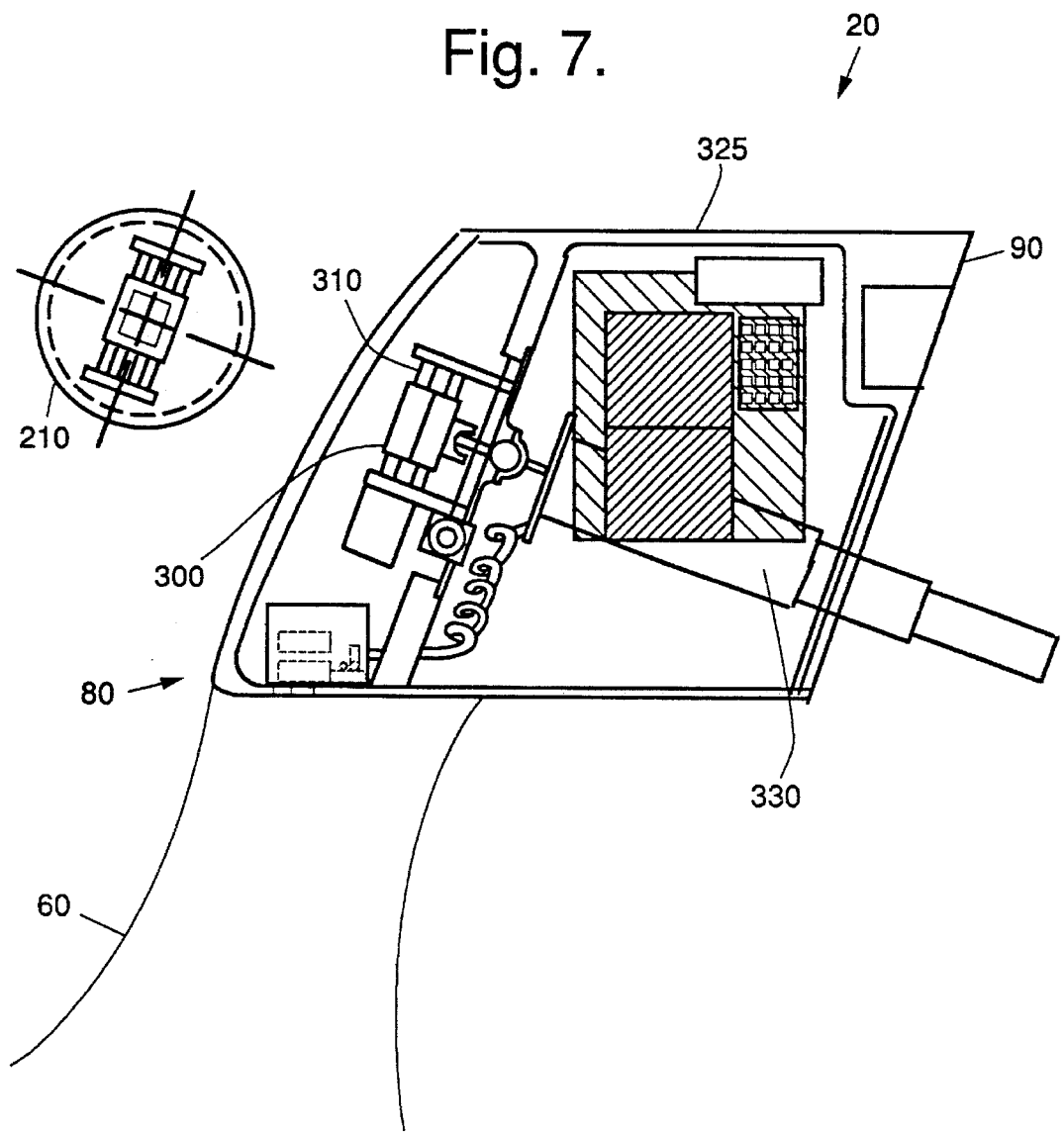
FIG. 7 is a detail view of the articulation mechanism of the charging probe.
Figure 8:
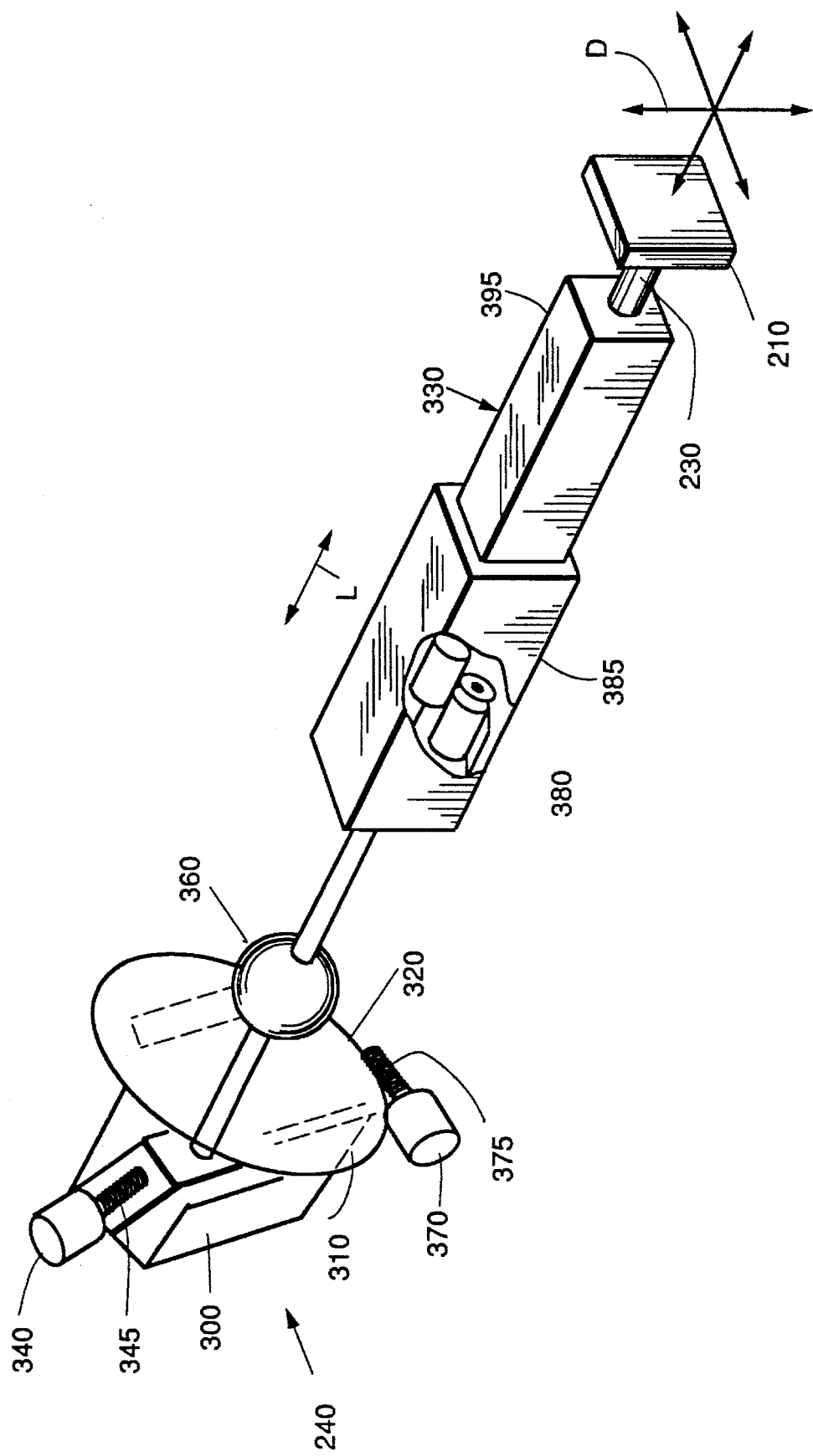
FIG. 8 is another detail view of an articulation mechanism according to the invention.

Providing for a flexible coupling 230 reduces the complexity of the probe alignment mechanism, as can be seen in FIGS. 7 and 8. Here, a single pivot three-axis mechanism 240 provides for movement of the probe 40 in the x, y, and z axes. A collar 300 sliding on a carrier 31 0, in conjunction with the rotation of the carrier and collar assembly 320, provides for the x-y translational components, while extension and retraction of the arm 330 provides for the z axis translational component. The collar assembly 320 is fixed spatially with respect to the housing structure 325, and the carrier 310 is affixed to the collar assembly 320. It can be appreciated that the configuration of the housing structure 325 is not critical to an understanding of the invention, as the structure 325 serves to strengthen the housing 80 as well as provide a structure upon which to mount internal components.

In general terms, sliding the collar 300 on the carrier 31 0 causes the probe 40 to scribe a radial arc, rotating the carrier assembly 320 causes the probe 40 to scribe a cone, and extending and retracting the arm 330 extends and contracts the size of the arc or cone scribed. These movements are accomplished using a series of screw motors which engage racks on the various components.

More particularly, as shown in greater detail in FIG. 8, radial translation of the probe is accomplished by driving the screw motor 340 attached to the collar 310, where the screw motor 340 engages rack 345 located on the carrier 310 and causes linear translation of the collar 300 with respect to the carrier 310. Of course, the locations of the rack and screw motor could be reversed without affecting the mechanics of the motion. Moving the collar 300 with respect to the carrier 310 translates linear motion into a radial motion via linkage 350, which is attached to the moveable collar 300, through pivot ball 360, which is fixed within the collar assembly 320. Thus, a negative y-axis translation of the collar 300 with respect to the carrier 310 causes linkage 350 to translate counterclockwise with respect to the x-z plane, which pivots pivot ball 360 counterclockwise with respect to the x-z plane and results in a counterclockwise radial translation of the arm 330 with respect to the x-z plane, as illustrated here. This translational component is referred to on the figure as component R, indicated as a straight line.

Likewise, driving screw motor 370, which is affixed to the structure 325, imparts linear translation of rack 375, which is affixed to the collar assembly. Although not shown specifically, the collar assembly 320 rotates within a bearing journal which is fixed to the structure 325, thus allowing rotation of the collar assembly 320 within the journal while still fixing the spacial position of the collar assembly 320 with respect to the structure 325. The rack 375 is curved to a radius similar to the radius of the collar assembly and extends the full circumference of the collar assembly 320 so that the collar assembly can be translated through a full 360o rotation. This translational component is referred to on the figure as component W, indicated as a curved arch.

Finally, extension and retraction of the arm 330 is accomplished by driving screw motor 380, which is affixed to outer sleeve 385, which engages rack 390 and imparts linear translation to rack 390 and inner sleeve 395, to which the rack 390 is affixed. This translational component is referred to on the figure as L, and is indicated as a straight line. Combined, components R, W, and L provide six degrees of freedom of movement for the probe 40, as indicated by arrows D. Moreover, flexible coupling 230 allows the probe face 100 to pivot with respect to the probe 40 to allow fine alignment compensation as discussed earlier.

Figure 9:
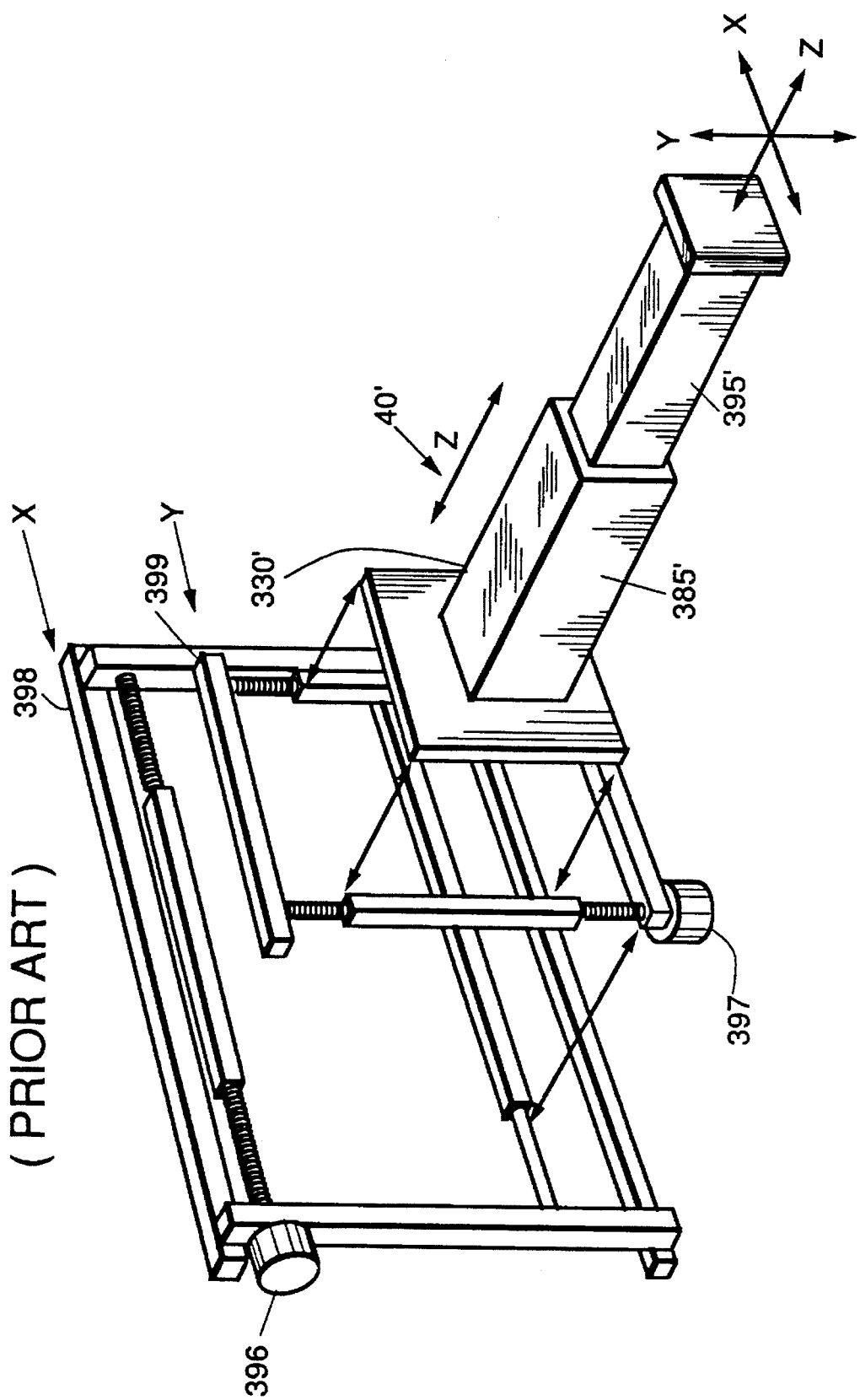
FIG. 9 is an articulation mechanism according to the prior art.

The simplicity and grace of this mechanism can be appreciated by referring to an illustration of prior art systems shown in FIG. 9. Here, it can be seen that only purely linear motion components can be accomplished through the movement of a single drive. For example, to move the probe 40' in an arc along the x-y plane rather than a straight line, the arm 330' must be translated in the z-axis direction by the mechanism driving inner sleeve 395' with respect to outer sleeve 385' while also inducing an x or y axis translation by driving the x or y axis mechanisms 396, 397. In contradistinction, the mechanism of the present invention accomplishes radial motion by simply translating the collar 300 along the carrier 310. Also, in the prior art mechanism, both the x and y axis mechanisms 396, 397 require platforms 398, 399, and each platform 398, 399 must be capable of supporting both its own mechanism as well as the weight of successive mechanisms. For example, as shown here, the x translation platform 398 supports the weight of the y translation platform 399 and the z translation sleeves 385', 395', while the y translation platform 399 supports the z translation sleeves 385', 395'. Thus, not only are prior known systems heavier, but the mechanisms themselves must be bulkier and sturdier to support the successive loads imposed by the staged translational mechanisms. In contradistinction, the collar assembly 320 and its journal are affixed to the structure 325 which bears most of the load. Finally, the mechanism of the present invention has fewer parts and is easier to assemble and maintain.

The sequence of movements necessary to articulate the arm 330 so that the charge probe face 210 and the charge port face 100 mate are described in FIGS. 10A through 11B. As was discussed earlier, once the vehicle specific information is sent in the electromagnetic signal 400, the charge station 20 configures itself to deliver the proper charging rate for the specified charge time required for the vehicle, and determines the proper initial positioning for the probe arm 410. Since the electromagnetic signal 30 is sent to the charge station 20 as the vehicle 10 is approaching, upon receiving the signal 400 and configuring to receive the vehicle 410, the charge station 20 waits for a predetermined amount of time 420 to allow the vehicle driver sufficient time to actually dock the vehicle. As was earlier discussed, docking of the vehicle is accomplished by aligning the alignment diode interference patterns so that they form a single point. Having waited to allow the vehicle to dock 420, the next task of the charge station 20 is to position the probe arm at the initial proximity position 430 and begin the task of connecting the probe arm with the charge port. As was earlier discussed, the charge port 50 has alignment emitters 130–160 which emit a pulsed light signal. The charge probe, on the other hand, has alignment detectors 170–200 calibrated to detect these pulsed signals. Proper alignment is achieved when all emitter signals are received at their corresponding detectors. Thus, at step 440, the logic processor of the charge station 20 determines whether all emitter signals are being received. If they are not all being properly received 450, the logic circuit commands the articulation mechanism to execute a hunt sequence 460. This hunt sequence 460 will be described in greater detail later. Once all emitter signals are properly received 470, the charging connection is established 480 and charging power is delivered to the vehicle 490 until charging is completed 500.

Figure 10A:
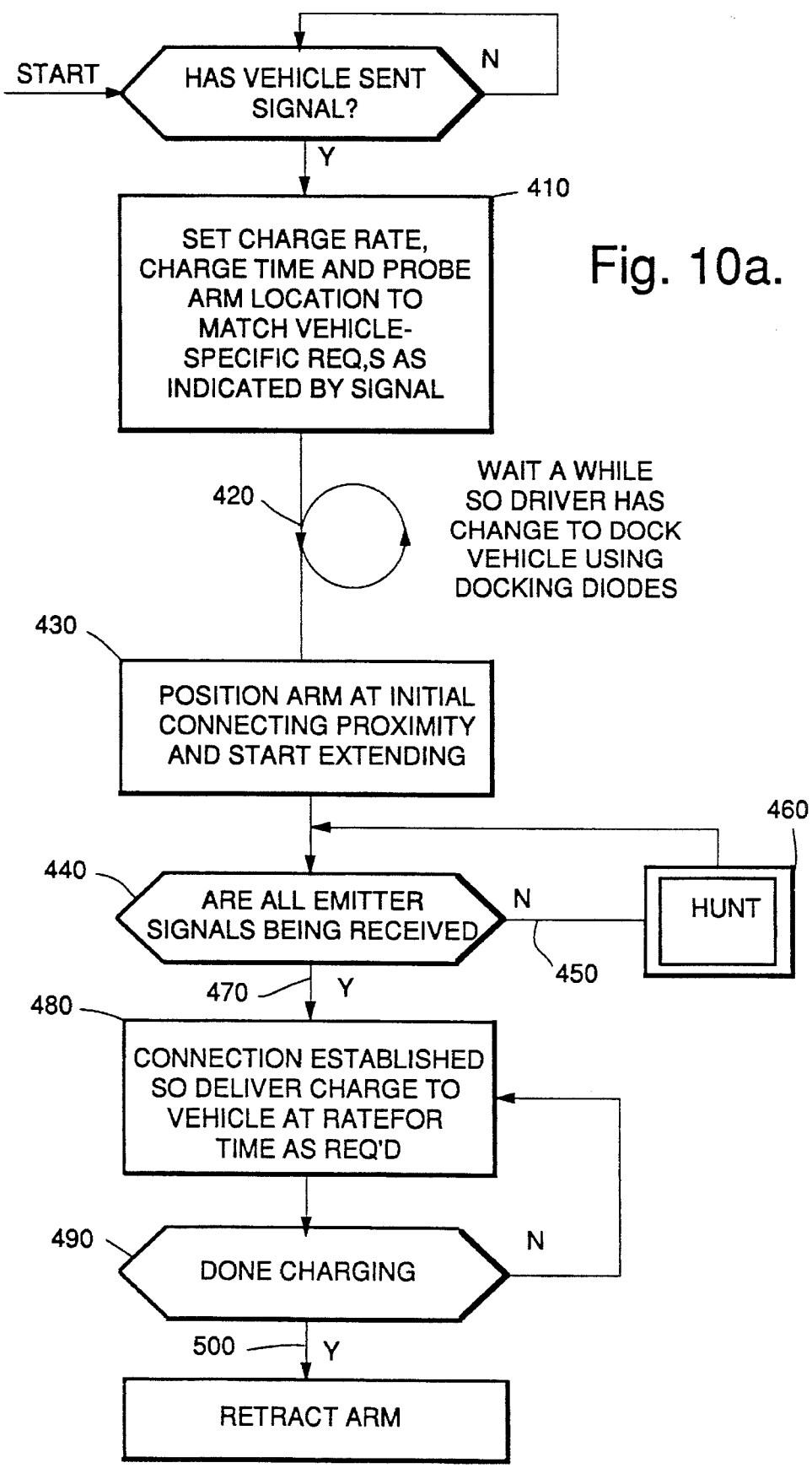
FIGS. 10A and 10B are flow charts depicting the logic steps required for charging a vehicle.
Figure 10B:
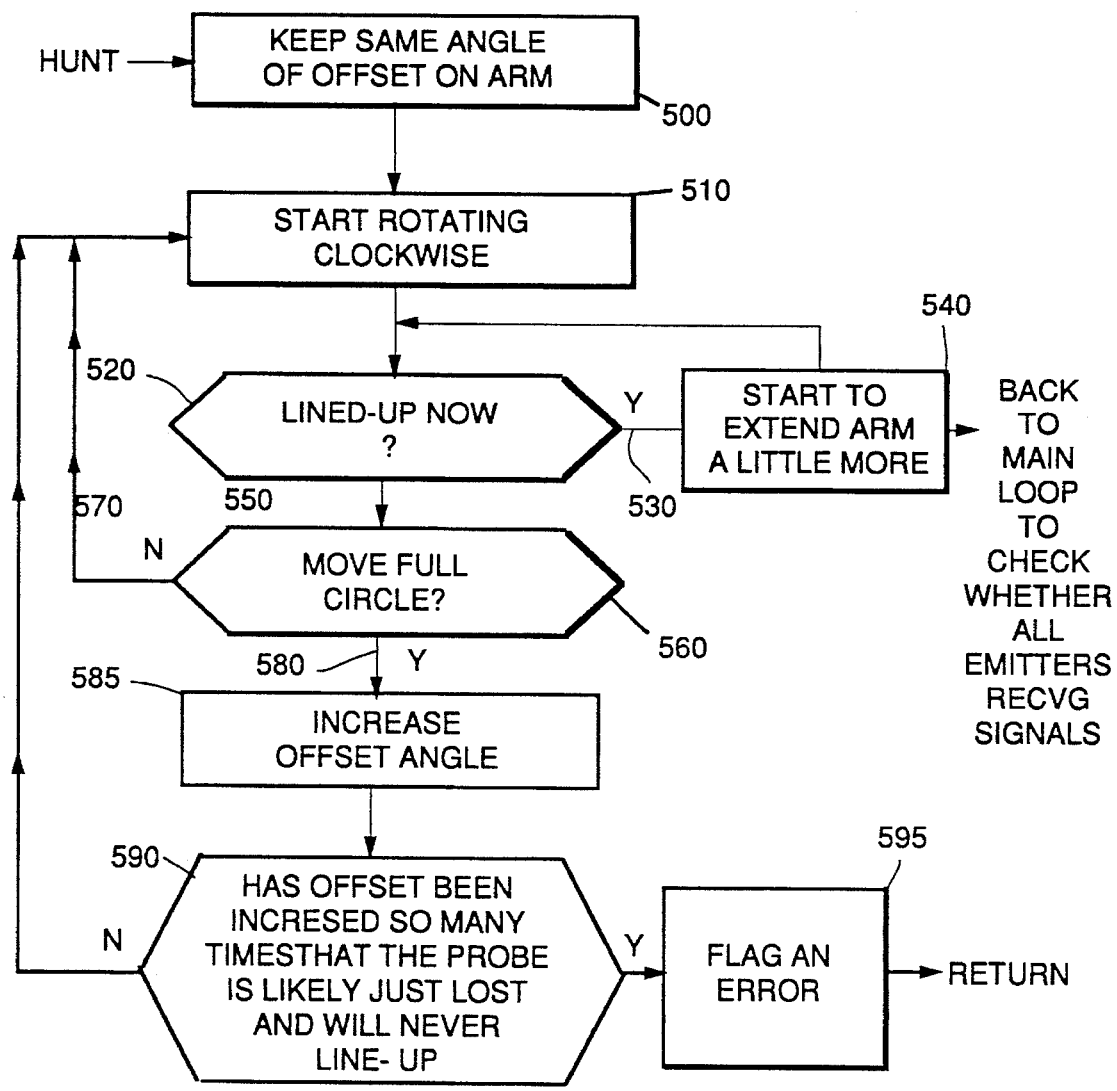

Because of all the variables associated with the alignment of the vehicle with regard to the charge station, the most obvious of these variables being the driver and his ability to align the vehicle, the charge station logic articulates the charge probe arm through a hunt sequence 460 in order to ensure proper alignment is achieved. Referring now to FIG. 10B in combination with FIGS. 11A and 11B, the hunt sequence involves systematically articulating the arm to determine the proper x, y and z coordinates for precise alignment. Initially, as was earlier discussed, the probe arm is positioned at a starting point 430 based on the vehicle set up information. However, in the event that this initial starting point proves to be slightly inaccurate in real life, the first step of the hunt sequence is to systematically vary the x-y orientation of the probe with regard to the charge port. This is accomplished by keeping the probe arm at the same initial offset 500 and slowly rotating the arm clockwise 510. Recalling the mechanism previously described, maintaining the same offset angle 500 is accomplished by maintaining the position of the collar 300 with respect to the slider 310. Rotating the arm 510 is then accomplished by rotating the mechanical assembly 320. After having rotated a predetermined number of degrees, such as 180° or 360°, the logic processor queries to determine if all emitters and detectors are lined up 520. If all signals are now lined up 530, the probe arm is slowly extended 540 and the checking 440 and hunting 460 process begin again. However, in the event that the emitters and detectors are not lined up 550 after the first degree rotation, the rotation process continues 560, 570 until the probe arm has been rotated a full 360° circle 580. In the event that the full rotational sweep just performed did not result in an alignment, the size of the sweep is expanded by increasing the offset angle 585 prior to conducting another sweep. Of course, the arm mechanism has a finite range. Thus, if that range has been exhausted 590 without a successful alignment resulting, an error situation 595 exists. An error situation could result from the vehicle being out of alignment, the emitters or detectors being faulty, or other such situation.

A hypothetical three-dimensional representation of a hunt sequence is illustrated in FIG. 11 B. As can be seen by the successive extension and hunt movements, the probe arm hunts 460 until alignment is achieved before it is extended toward the vehicle 430. If alignment is violated as the arm extends, new hunt sequences 460'–460''' are initiated periodically to ensure alignment is maintained as the probe continues extending 430'–430'''.

Figure 12:
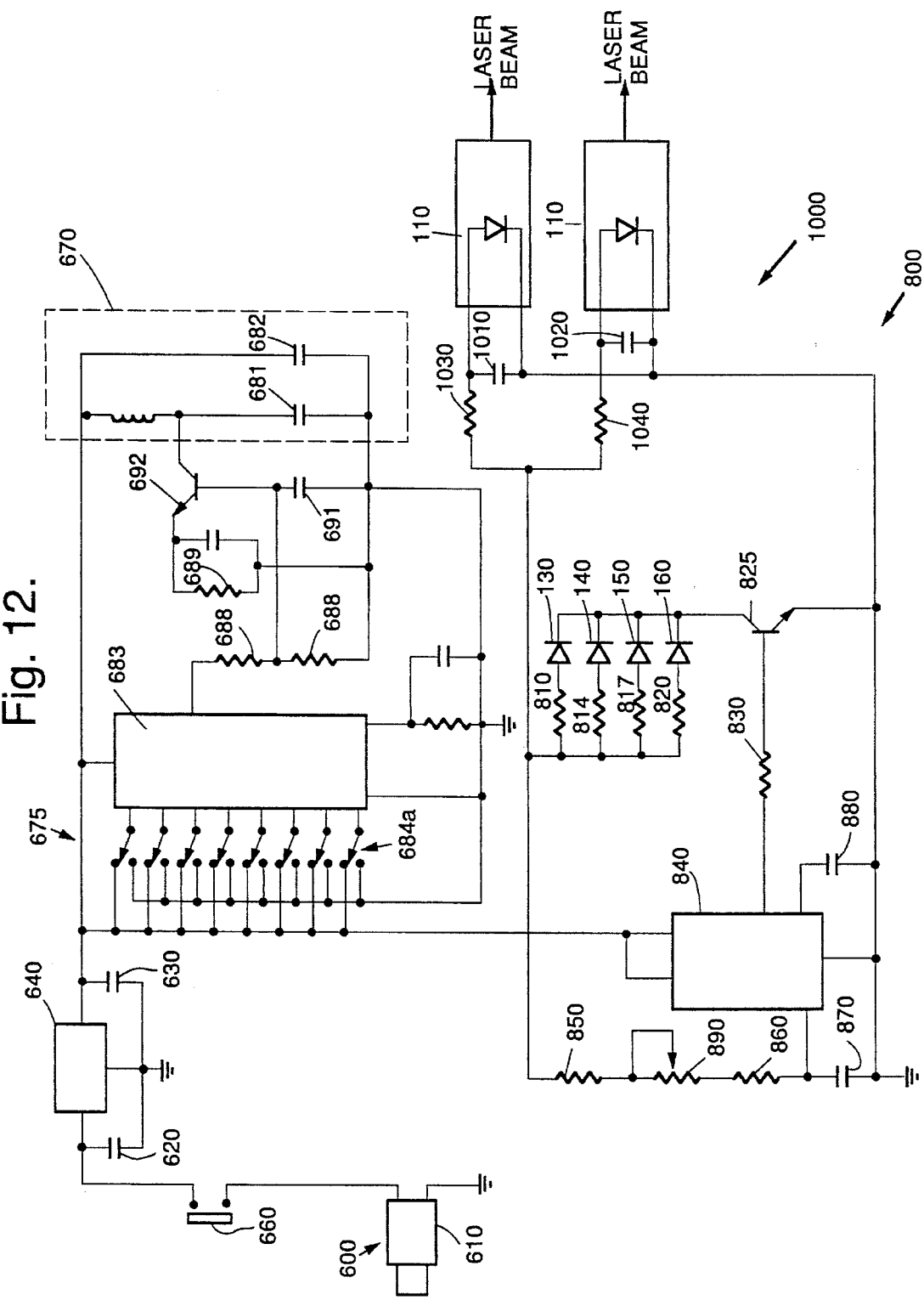
FIG. 12 is a detail of the circuitry necessary to implement the system at the vehicle.
Figure 11A:
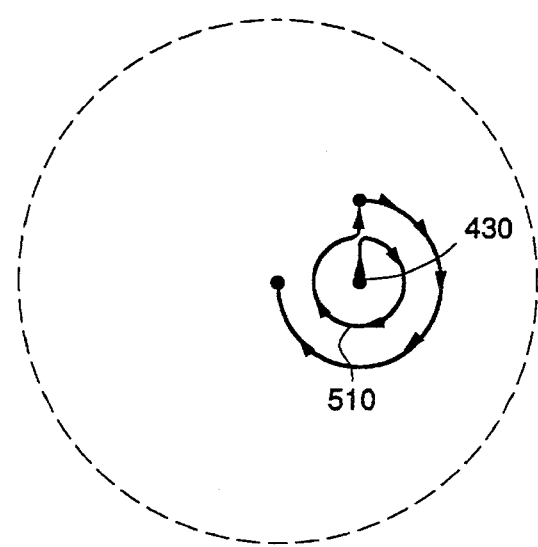
FIGS. 11A and 11B are illustrations of hypothetical charge probe movements.
Figure 11B:
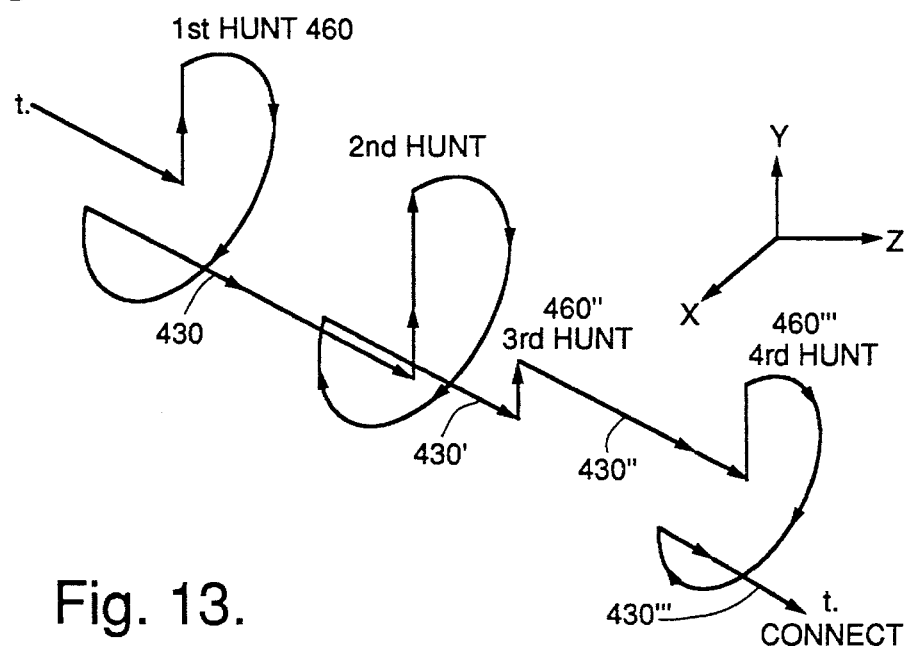
Figure 13:
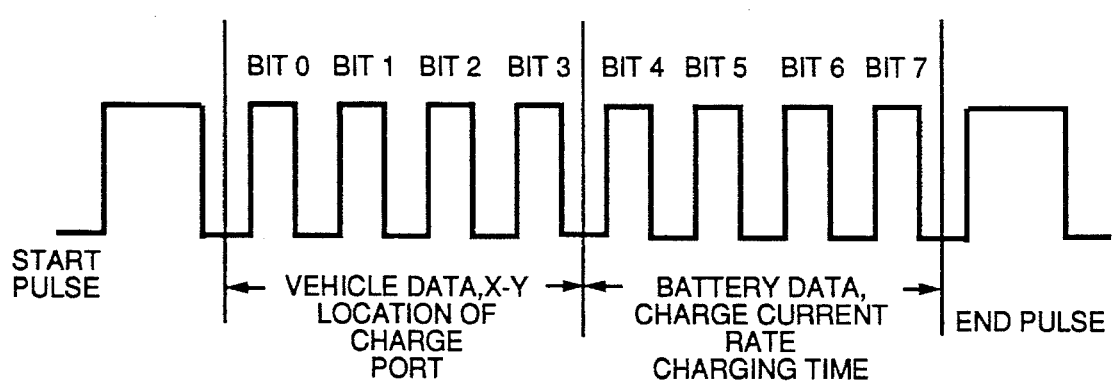
FIG. 13 is an illustration of the bit stream signal transmitted between the vehicle and the charge station.

As detailed in FIGS. 12–13, the circuitry for accomplishing these features can be implemented using commonly available components. The signal transmitter circuit 600, located on the vehicle 10, includes means for providing power to the transmitter. In this case, a 12 volt cigarette lighter power adapter 610 is provided. However, it can be appreciated that the transmitter could also be hard-wired into the vehicle power system. The transmitter is powered by an LM-340-7805 device 640, commonly available from a variety of semi-conductor suppliers, and actually generates the electromagnetic signal 30. More particularly, the transmitter power circuit also includes a 0.33 μFd capacitor 620 and a 0.1 μFd capacitor 630 in parallel with the transmitter power chip 640. A push button switch 660, actuable by the vehicle driver, interrupts the circuit between the power supply and the transmitter. By depressing the switch 660, the vehicle driver allows power to be delivered to the transmitter 640 which transmits the electromagnetic signal 30 to the charging station 20 via the transmitter antenna 670. The transmitted signal itself is generated in the choke circuit, which includes an oscillator circuit 670 and encoder circuit 675. The oscillator circuit 670 includes a coil 680 tied to a 39 μFd capacitor 681 and a 4.5 μFd capacitor 682. The encoder circuit 675 includes a shift register chip 683, where the switch positions 684a through 684f determine the characteristics of the transmitted signal. Thus, the positioning of the switches 684a–684f is used to indicate the vehicle-specific information and can be set in the factory. The rest of the encoder circuit includes 390 kΩ resistor, 100 μFd capacitor 686, 27 kΩ, 56 kΩ and 22 kΩ resistors 687–689, 4 μFd capacitor 690, 39 μFd capacitor 691 and transistor 692.

As illustrated in FIG. 13, the vehicle-specific signal transmitted from the transmitter circuit 600 can be represented as a bit stream. Here, it can be seen that part of the signal comprises vehicle charge port location information, while the remainder of the signal comprises charge rate and charge capacity information.

Figure 14B:
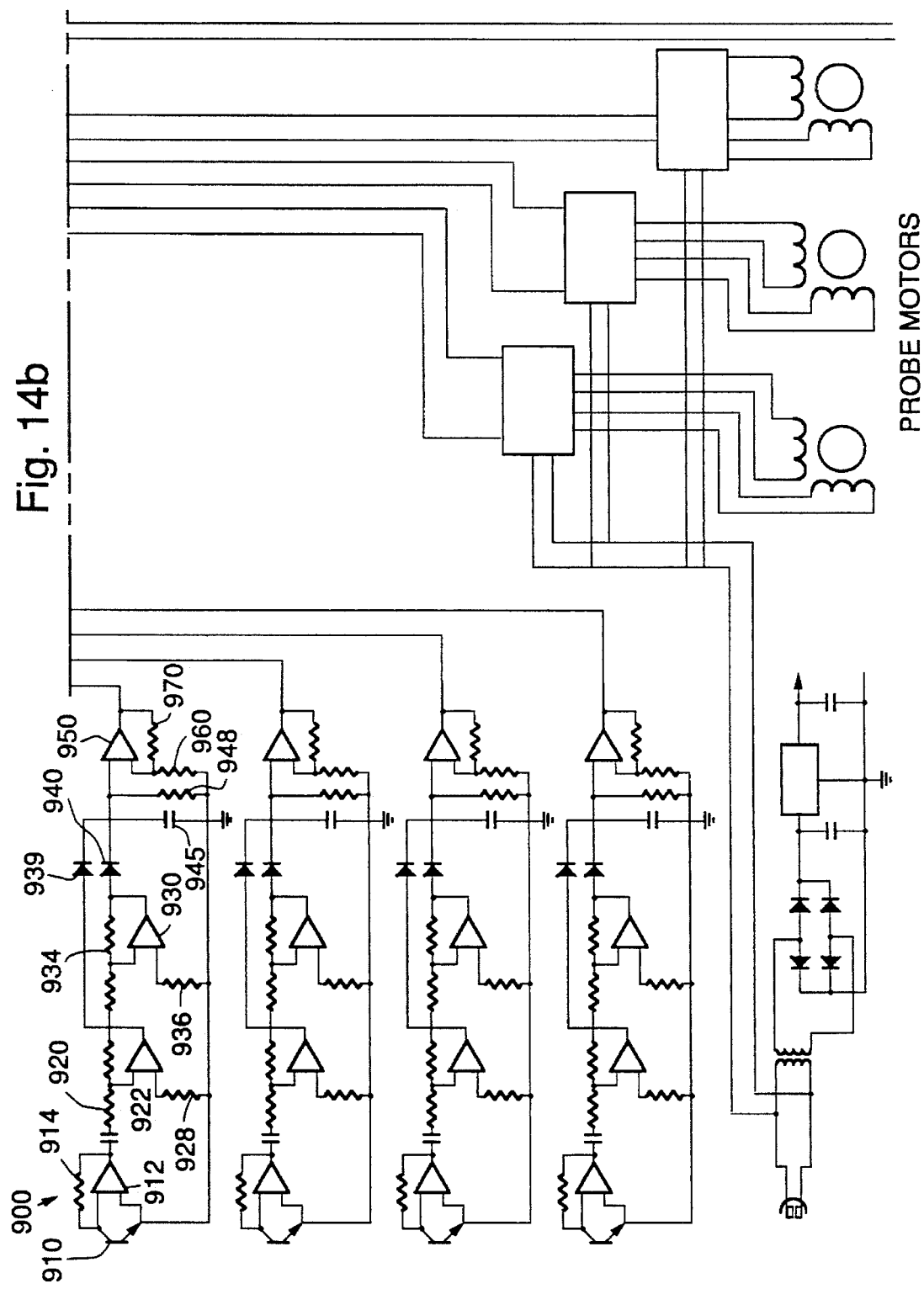

The transmitted signal 30 is received and decoded at the charge station 20 via the receiver circuit, detailed in FIGS. 14a and 14b. The bit stream signal is received at the receiver amplifier circuit 710, which reconverts the bit stream data from the RF signal and sends that data to a microprocessor 720. The microprocessor 720 interprets the bit stream data and controls the movements of the articulable arm for the purposes of both moving the arm into its initial crude alignment position as well as moving the arm to achieve fine alignment. These functions will be described in greater detail later in the disclosure. Also, the receiver amplifier circuit is of common design and need not discussed in great detail to understand its operation.

Referring to both FIGS. 12 and 14, the docking positioning diodes 110–120 and alignment emitters 130–160 on the charge port 50 are powered by separate 5 volt circuits. The alignment emitter circuit 800 on the vehicle and its corresponding emitter detector circuit 900 at the charging station cooperate to allow for the fine adjustment of the probe arm with respect to the vehicle charge port, while the docking positioning diode circuit 1000 powers the vehicle alignment beams which form the visible interference pattern that guides the driver as he positions the vehicle with respect to the charging station.

The alignment emitter circuit 800 includes 36Ω resistors 810–820 in parallel with the emitters 130–160, which are tied in parallel to the source of transistor 825, which is a commonly available 2N301 9 transistor. The remainder of the circuit includes a 1KΩ resistor 830 tied to the base of the transistor 825, which leads to a timer chip 840. The 555 time chip 840 is biased by a 1KΩ resistor 850, a 10KΩ resistor 860, a 4.7 μFd capacitor 870, a 0.01 μFd capacitor 880 and a 100KΩ variable resistor 890. This biasing produces a clocked timing cycle of approximately 3 KHz. As was discussed earlier, pulsing the diodes at this frequency provides a uniquely identifiable light signal for the alignment detectors 170–200, making the system less prone to produce false alignment signals due to ambient light conditions.

The alignment emitter detector circuit 900 comprises four identical infrared receiver amplifier circuits comprising a receiver transistor 910 tied into op-amp 912, which is biased by 10MΩ resistor 91 4. The next stage of the amplifier circuit includes filtering capacitor 918, which is a 1 μFd capacitor, leading to the second stage comprising 10KΩ resistor 920, op-amp 922, and 100KΩ resistors 924 and 928. The third stage comprises op-amp 930, 10KΩ resistor 932, 934, and 5KΩ resistor 936. Diodes 939, 940 serve to further filter the circuit prior to reaching the final stage, where 1 μFd capacitor 945 and 10KΩ resistor 948 shape the signal for op-amp 950, 1KΩ resistor 960 and 10KΩ resistor 970. Analog-to-digital converter 980 converts the analog signal output by the receiver amplifier circuits 900 to a digital signal for interpreting by the microcomputer 720.

The docking alignment circuit 1000 includes the two light emitters 110, 120 powered by identical 100 μFd 1010, 1020 and 2Ω resistor 1030, 1040 circuits. As discussed earlier, the emitters 110, 120 produce a light interference pattern which converges into a single light spot once the vehicle is within the proper vicinity of the charge station.

The display panel circuitry, as shown in FIGS. 14a and 14b, can include red, yellow and green indicator lamps 1100–1110 to provide the driver with positive feedback as to how well the docking and probe alignment processes are going, and numerical displays 1130–1150 provide information as to the amount of charge delivered to the vehicle. For example, when the charging station receives the vehicle-specific bit stream signal, the yellow lamp 1105 can be illuminated to indicate that a docking sequence has been requested. The lamp will remain illuminated for a period of time, such as one minute, while the driver docks the vehicle using the docking alignment beams 110, 120. After the docking period has expired, the red lamp 1100 will illuminate to indicate the charge station is deploying the probe arm to begin the automated probe alignment sequence using the pulsed emitters 130–160 and photodetectors 910. Upon successfully coupling the charge probe face plate with the vehicle charge port, the green lamp 1110 is illuminated and the numerical display 1130–1150 activated to indicate the vehicle is being charged. Finally, once charging is completed and the probe retracts, the green lamp 1110 can remain illuminated for a predetermined period of time, such as an hour, to provide positive feedback to the driver that a successful charging sequence was completed.

Because the charging station is designed to be fully automated, it may be desirable to provide capabilities for accepting credit and debit cards. For example, a card reader could be provided at the display of the charge station 20 whereby the vehicle driver would have to present a credit or debit card for scanning prior to the charge station delivering charging power to the vehicle 10.

The foregoing description of the presently preferred embodiment has been provided for the purposes of illustration. It can be appreciated by one of ordinary skill in the art that modifications could be exercised without departing from the spirit or scope of the invention disclosed herein.

What is claimed is:

1. A method for docking an electric passenger vehicle with an electric charging station for recharging electric power storage devices in said electric vehicle, said method comprising the steps of:

aligning said electric vehicle with respect to said charging station;

automatically aligning a charging probe on said charging station with a charging receptacle on said electric vehicle;

automatically electrically connecting said charging probe with said charging receptacle;

automatically delivering charging power through said charging probe and charging receptacle connection to charge said storage devices; and automatically disengaging said charging probe from said charging receptacle when said storage devices are fully charged;

transmitting at least two vehicle alignment beams in a substantially horizontal plane from said electric vehicle toward said charging station, said beams aligned so as to form an intersecting interference pattern, said interference pattern providing a visual indication of whether said alignment beams are hitting said charging station at different points or at the same point;

viewing said interference pattern on said charging station;

moving said electric vehicle toward said charging station while said interference pattern indicates each beam is hitting said charging station at divergent points; and ceasing movement of said electric vehicle toward said charging station when said interference pattern indicates each beam is hitting said charging station at the same point.

2. A method as set forth in claim 1 further including the steps of:

transmitting at least two parallel probe alignment beams from said charging receptacle toward said charging probe:

articulating said charging probe to establish light beam communication between said probe alignment beams and corresponding probe alignment beam photodetectors located on said charging probe via corresponding beam alignors located on said charging probe; and ceasing articulation of said charging probe when communciation is established from said probe alignment beams through said corresponding beam alignors to said corresponding alignment beam photodetectors.

3. A method as set forth in claim 1 further including the steps of:

transmitting vehicle-specific information from said vehicle to said charging station;

extending said charging probe to a vehicle-specific starting position, said vehicle-specific starting position being a predetermined spacial position of said probe arm with respect to said vehicle from which said step of automatically aligning said probe arm with respect to said charge receptacle begins; and delivering a vehicle-specific rate of charge and a vehicle-specific capacity of charge to said storage devices upon having automatically connected said charging probe to said charging receptacle.

4. A method as set forth in claim 3 wherein said charging probe has a charge plate which engages said charging port and an articulable charge probe arm for spatially articulating said charge plate with respect to said charging receptacle, and wherein said charge probe arm has at least two alignment beam photodetectors and wherein said charge plate includes at least two beam alignors, wherein the step of automatically aligning said charging probe with said charging receptacle comprises:

transmitting at least two parallel probe alignment beams from said charging receptacle toward said charging probe;

articulating said charging probe to establish light beam communication between said probe alignment beams and said probe alignment beam photodetectors via said beam alignors; and ceasing articulation of said charging probe when light communication is established from said probe alignment beams through said corresponding beam alignors to said corresponding alignment beam photodetectors.

5. A method as set forth in claim 1 wherein said charging probe includes a first mechanism comprising a linearly translatable collar slidingly mounted on a carrier, a second mechanism comprising said carrier being rotatably mounted within a journal, and a third mechanism comprising a linearly translatable inner sleeve slidingly mounted within an outer sleeve, wherein said step of articulating said charging probe with respect to said charging receptacle includes:

moving said collar along said carrier to impart radial motion to said charging probe;

rotating said carrier within said journal to impart rotational motion to said charging probe; and moving said inner sleeve within said outer sleeve to impart longitudinal motion to said charging probe.

6. A cooperative docking system for an electric passenger vehicle, said system comprising:

charging station means for charging said electric vehicle, said charging station means comprising power means for generating charging power and probe means for electrically connecting said electric vehicle with said power means and for delivering said charging power to said electric vehicle;

vehicle alignment means for aligning said electric vehicle with respect to said charging station;

probe alignment means for aligning said probe means with respect to said electric vehicle; and sequence initiation means for initiating a docking sequence wherein said vehicle alignment means, said probe alignment means, said probe means and said power means cooperate to align said electric vehicle with said charging station, align said probe with said electric vehicle, establish electrical charging power delivery through said probe to said electric vehicle to charge said electric vehicle, and discontinue said delivery of charging power to said electric vehicle when said electric vehicle is fully charged, wherein said vehicle alignment means comprises at least two vehicle alignment beams transmitted in a substantially horizontal plane from said electric vehicle toward said charging station, said beams aligned so as to form an intersecting interference pattern said interference pattern providing a visual indication of whether said alignment beams are hitting said charging station at different points or at the same point, wherein a driver of said electric vehicle can view said interference pattern on said charging station and can move said electric vehicle toward said charging station while said interference pattern indicates each beam is hitting said charging station at divergent points and can cease movement of said electric vehicle toward said charging station when said interference pattern indicates each beam is hitting said charging station at the same point.

7. A system as set forth in claim 6 wherein said probe means comprises an articulable arm, and wherein said probe alignment means comprises:

at least two alignment beams emitted from said electric vehicle toward said articulable arm;

at least two photodetectors located on said articulable arm near an end of said arm furthest away from said electric vehicle; and at least two alignor passages located on said articulable arm near an end closest to said electric vehicle, where said articulable arm is articulated until light communication is established between said alignment beams and said photodetectors via said alignor passages.

8. A system as set forth in claim 7 wherein said alignment means further comprises logic means for executing a probe alignment search sequence, wherein said search sequence comprises:

transmitting said alignment beams from said electric vehicle toward said articulable arm;

articulating said articulable arm to establish light beam communication between said alignment beams and said photodetectors via said alignor passages; and ceasing articulation of said articulable arm when light communication is established from said alignment beams through said alignor passages to said photodetectors.

9. A system as set forth in claim 8 wherein said articulable arm comprises:

an inner sleeve slidably mounted within an outer sleeve, wherein sliding said inner sleeve within said outer sleeve imparts z-axis articulation;

a housing rotatably mounted within a fixed journal, wherein rotating said housing within said journal imparts rotational articulation;

a collar slidably mounted on a carrier, wherein sliding said collar along said carrier imparts radial articulation;

a pivot ball pivotally mounted within said housing; and a linkage pivotally connected on one end to said collar and connected on the other end to said pivot ball;

said outer sleeve connected to the side of said pivot ball opposite the side said collar is linkably connected to said pivot ball, said carrier connected to said housing on a side of said housing adjacent to the side of said pivot ball where said collar is linkably connected, where sliding said inner sleeve within said outer sleeve translates said inner sleeve along the z-axis with respect to said outer sleeve and said housing, where rotating said housing within said journal rotates said inner and outer sleeves with respect to said journal, and wherein sliding said collar along said carrier sweeps said inner and outer sleeves in an arc with respect to said journal.

10. A system as set forth in claim 7 wherein said alignment beams are pulsed at a predetermined rate to produce a pulsed light signal and wherein said photodetectors are tuned to detect said pulsed light signal, and wherein said photodetectors generate an alignment signal when said pulsed light signals are communicated through said alignor passages to said photodetectors and wherein said photodetectors do not generate an alignment signal if light not of said predetermined pulsed rate is communicated to said photodetectors, whereby said probe alignment means is made resistant to generating false alignment signals due to ambient light.

11. A system as set forth in claim 6 wherein said sequence initiation means comprises a sequence initiation transmitter located on said electric vehicle and a sequence initiation receiver located on said charging station.

* * * * *